United States Patent
Zaghetto et al.

(10) Patent No.: US 11,375,208 B2
(45) Date of Patent: Jun. 28, 2022

(54) TRISOUP NODE SIZE PER SLICE

(71) Applicant: SONY CORPORATION, Tokyo (JP)

(72) Inventors: Alexandre Zaghetto, San Jose, CA (US); Danillo Graziosi, San Jose, CA (US); Ali Tabatabai, Cupertino, CA (US); Ohji Nakagami, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/030,244

(22) Filed: Sep. 23, 2020

(65) Prior Publication Data

US 2021/0400280 A1 Dec. 23, 2021

Related U.S. Application Data

(60) Provisional application No. 63/043,116, filed on Jun. 23, 2020.

(51) Int. Cl.
| | |
|---|---|
| *H04N 19/167* | (2014.01) |
| *H04N 19/174* | (2014.01) |
| *G06T 9/00* | (2006.01) |
| *H04N 19/119* | (2014.01) |
| *H04N 19/96* | (2014.01) |

(52) U.S. Cl.
CPC ............ *H04N 19/167* (2014.11); *G06T 9/00* (2013.01); *H04N 19/119* (2014.11); *H04N 19/174* (2014.11); *H04N 19/96* (2014.11)

(58) Field of Classification Search
CPC .. H04N 19/167; H04N 19/174; H04N 19/119; H04N 19/96; G06T 9/00
See application file for complete search history.

(56) References Cited

U.S. PATENT DOCUMENTS

| | | |
|---|---|---|
| 10,192,353 B1 | 1/2019 | Chou et al. |
| 2017/0347122 A1* | 11/2017 | Chou ..................... H04N 19/36 |
| 2019/0087979 A1 | 3/2019 | Mammou et al. |
| 2020/0302686 A1* | 9/2020 | Totty ........................ G06T 5/50 |
| 2020/0334866 A1* | 10/2020 | Lasserre ................ H04N 19/20 |
| 2021/0012539 A1* | 1/2021 | Zhang ....................... G06T 9/40 |
| 2021/0029187 A1* | 1/2021 | Oh ...................... H03M 7/3062 |

OTHER PUBLICATIONS

International Search Report with Written Opinion dated Sep. 16, 2021 for PCT Application No. PCT/US2021/038162.

* cited by examiner

*Primary Examiner* — Tat C Chio
(74) *Attorney, Agent, or Firm* — Haverstock & Owens, A Law Corporation

(57) ABSTRACT

Trisoup node size per slice enables flexibility when encoding a point cloud. Instead of each block/node being the same size, a user or machine is able to indicate block/node sizes such that regions of interest are able to have smaller node sizes for more specificity in that region.

24 Claims, 14 Drawing Sheets

- Constant trisoup_node_size_log2 = 4
- r01, trisoup-raht redandblack_viewdep_vox12, r01 to r06 trisoup_node_size_log2 value was kept constant (as specified in the CTC) for slices 1, 2 and 3, and for slice 0 it was set to 1.

TRISOUP NODE SIZE PER SLICE

CROSS-REFERENCE TO RELATED APPLICATION(S)

This application claims priority under 35 U.S.C. § 119(e) of the U.S. Provisional Patent Application Ser. No. 63/043,116, filed Jun. 23, 2020 and titled, "TRISOUP NODE SIZE PER SLICE," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

A point cloud is composed of a collection of points in a 3D space, each point associated with a (x, y, z) geometry position together with attribute information (color, reflectance and more). It can be used in several applications such as virtual/augmented reality, immersive telepresence, autonomous driving, cultural heritage archival, 3D free viewpoint, geographic information systems etc. A point cloud can be made up of thousands up to billions of points. In order to make them viable, compression is necessary.

MPEG started its point cloud compression (PCC) standardization with a Call for Proposal (CfP) in 2017. Three categories of point clouds were identified: category 1 for static point clouds, category 2 for dynamic point clouds, and category 3 for LiDAR sequences (dynamically acquired point clouds). Two technologies were finally defined: G-PCC (Geometry-based PCC) for category 1 and category 3; and V-PCC (Video-based PCC) for category 2. The first test models were developed in Oct. 2017, one for G-PCC (TMC13) and another one for V-PCC (TMC2). Since then, the two test models have evolved through technical contributions and collaboration, and the first version of the PCC standard specifications is expected to be finalized in 2020.

V-PCC first divides the point cloud into 3D connected regions called 3D patched. Then, each 3D patch is projected onto a 2D patch. These projection acts like a virtual orthographic camera, capturing a specific part of the point cloud. Combining these camera images, a mosaic that contains the collection of projected 2D patches is generated. This process results in a collection of metadata information and up to three associated images: (1) an occupancy map; (2) a geometry image; and (3) several attribute image(s). The resulting 2D representation of the point cloud is then encoded using 2D video coders.

In G-PCC, geometry and attributes are encoded separately. The compressed geometry is typically represented as an octree from the root all the way down to a leaf level of individual voxels. Alternatively, the representation can stop at a level with blocks larger than voxels and use triangle soup to approximate the surface within each leaf A predictive geometry coding scheme is also available. Regarding attribute coding, there are three methods in G-PCC: Region Adaptive Hierarchical Transform (RAHT), Predicting Transform, and Lifting Transform.

SUMMARY OF THE INVENTION

Trisoup node size per slice enables flexibility when encoding a point cloud. Instead of each block/node being the same size, a user or machine is able to indicate block/node sizes per point cloud slice. This feature enables, for instance, region of interest coding, with smaller node sizes for more specificity in that region.

In one aspect, a method programmed in a non-transitory memory of a device comprises receiving point cloud information, segmenting the point cloud information into a plurality of slices, determining a plurality of node sizes and encoding the point cloud using a node size of the plurality of node sizes for each of the plurality of slices. The node size can be determined according to a region of interest criterion. The node size is decreased for the region of interest. The plurality of node sizes includes smaller node sizes for the slices that represent the region of interest and larger node sizes for the remaining slices. An amount of the plurality of slices is not required to equal the amount of the plurality of node sizes. The plurality of node sizes is programmed by a user by specifying the node size in a configuration file. The plurality of node sizes is determined using machine learning. The plurality of node sizes is determined according to any arbitrary criteria other than region of interest.

In another aspect, an apparatus comprises a non-transitory memory for storing an application, the application for: receiving point cloud information, segmenting the point cloud information into a plurality of slices, determining a plurality of node sizes and encoding the point cloud using a node size of the plurality of node sizes for each of the plurality of slices and a processor coupled to the memory, the processor configured for processing the application. The node size can be determined according to a region of interest criterion. The node size is decreased for the region of interest. The plurality of node sizes includes smaller node sizes for the slices that represent the region of interest and larger node sizes for the remaining slices. An amount of the plurality of slices is not required to equal the amount of the plurality of node sizes. The plurality of node sizes is programmed by a user by specifying the node size in a configuration file. The plurality of node sizes is determined using machine learning. The plurality of node sizes is determined according to any arbitrary criteria other than region of interest.

In another aspect, a system comprises an encoder configured for: receiving point cloud information, segmenting the point cloud information into a plurality of slices, determining a plurality of node sizes and encoding the point cloud using a node size of the plurality of node sizes for each of the plurality of slices and a decoder configured for decoding the encoded point cloud information. The node size can be determined according to a region of interest criterion. The node size is decreased for the region of interest. The plurality of node sizes includes smaller node sizes for the slices that represent the region of interest and larger node sizes for the remaining slices. An amount of the plurality of slices is not required to equal the amount of the plurality of node sizes. The plurality of node sizes is programmed by a user by specifying the node size in a configuration file. The plurality of node sizes is determined using machine learning. The plurality of node sizes is determined according to any arbitrary criteria other than region of interest.

DETAILED DESCRIPTION OF THE PREFERRED EMBODIMENT

Geometry-based Point Cloud Compression (G-PCC) is a standard for point cloud coding technology with a compression capability that exceeds other approaches. G-PCC performs geometry coding using the octree, trisoup or predictive geometry scheme. In trisoup, the geometry is represented by a pruned octree, constructed from the root to an arbitrary level, where the leaves represent occupied nodes that are larger than a voxel. The object surface is approximated by a series of triangles and since there is no connectivity information that relates the multiple triangles, the technique is called "triangle soup" or (trisoup).

G-PCC encodes the content directly in 3D space. In order to achieve that, G-PCC utilizes data structures, such as an octree that describes the point locations in 3D space. Furthermore, G-PCC makes no assumption about the input point cloud coordinate representation. The points have an internal integer-based value, converted from a floating point value representation. This conversion is conceptually similar to voxelization of the input point cloud, and can be achieved by scaling, translation, and rounding.

Another important concept for G-PCC is the definition of tiles and slices to allow parallel coding functionality. In G-PCC, a slice is defined as a set of points (geometry and attributes) that can be independently encoded and decoded. A tile is a group of slices with bounding box information. A tile may overlap with another tile, and the decoder can decode a partial area of the point cloud by accessing specific slices.

One limitation of the current G-PCC standard is that it is only defined for intra prediction, that is, it does not currently use a temporal prediction tool. Nevertheless, techniques based on point cloud motion estimation and inter prediction are being considered for the next version of the standard.

Figure 1:
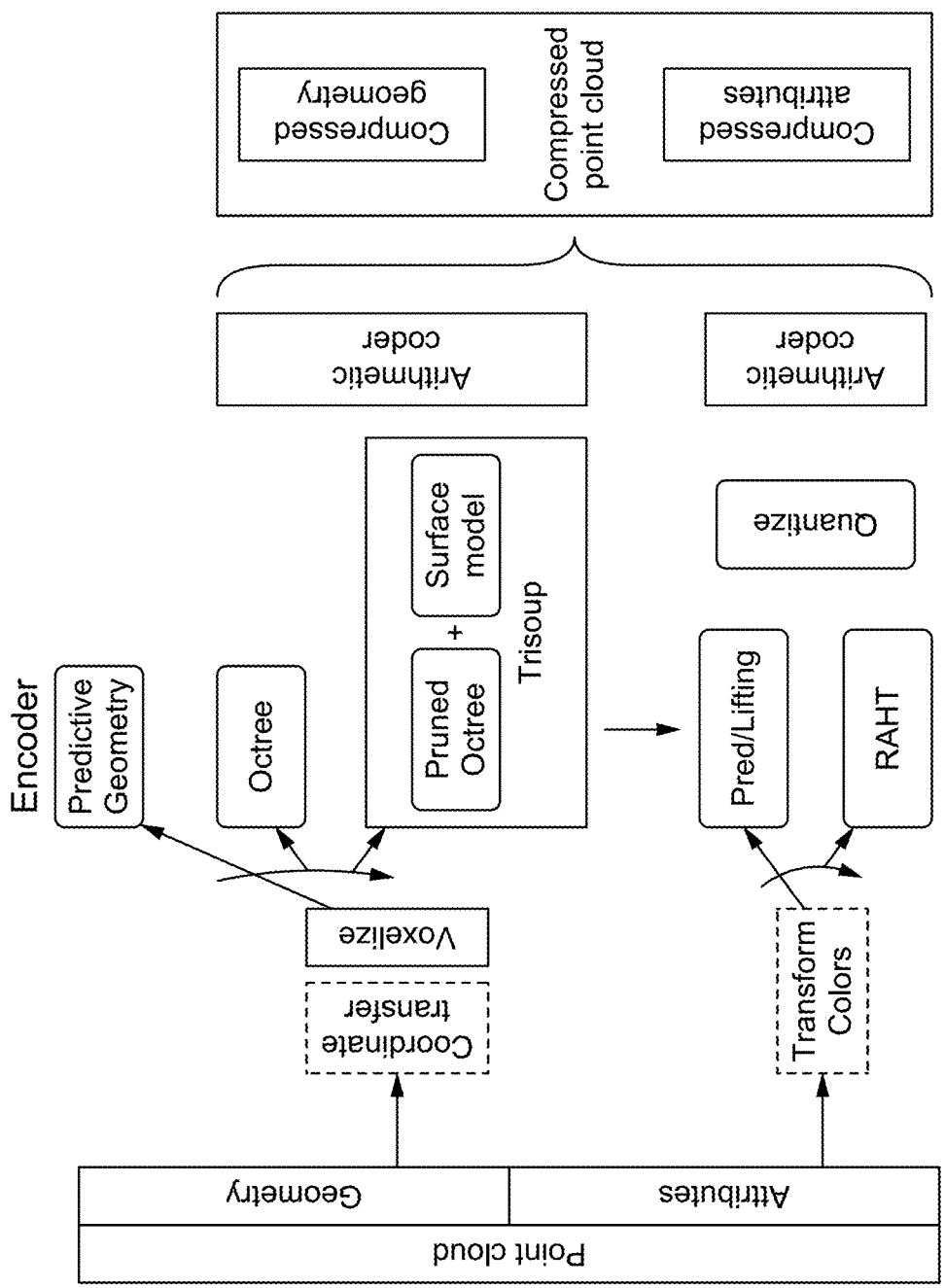
FIG. 1 illustrates a block diagram depicting the G-PCC reference encoder, also known as TMC13, according to some embodiments.

FIG. 1 shows a block diagram depicting the G-PCC reference encoder, also known as TMC13, according to some embodiments. It is not meant to represent TMC13's complete set of functionalities but only some of its core modules. First, one can see that geometry and attributes are encoded separately. However, attribute coding depends on decoded geometry. As a consequence, point cloud positions are coded first.

Source geometry points may be represented by floating point numbers in a world coordinate system. Thus, the first step of geometry coding is to perform a coordinate transformation followed by voxelization. The second step includes the geometry analysis using the octree, trisoup or predictive geometry scheme. Finally, the resulting structure is arithmetically encoded. Regarding attributes coding, TMC13 supports an optional conversion from RGB to YCbCr. After that, one of the three available transforming tools is used, namely, the Region Adaptive Hierarchical Transform (RAHT), the Predicting Transform, and the Lifting Transform. Following the transform, the coefficients are quantized and arithmetically encoded.

Octree Coding

Figure 2:
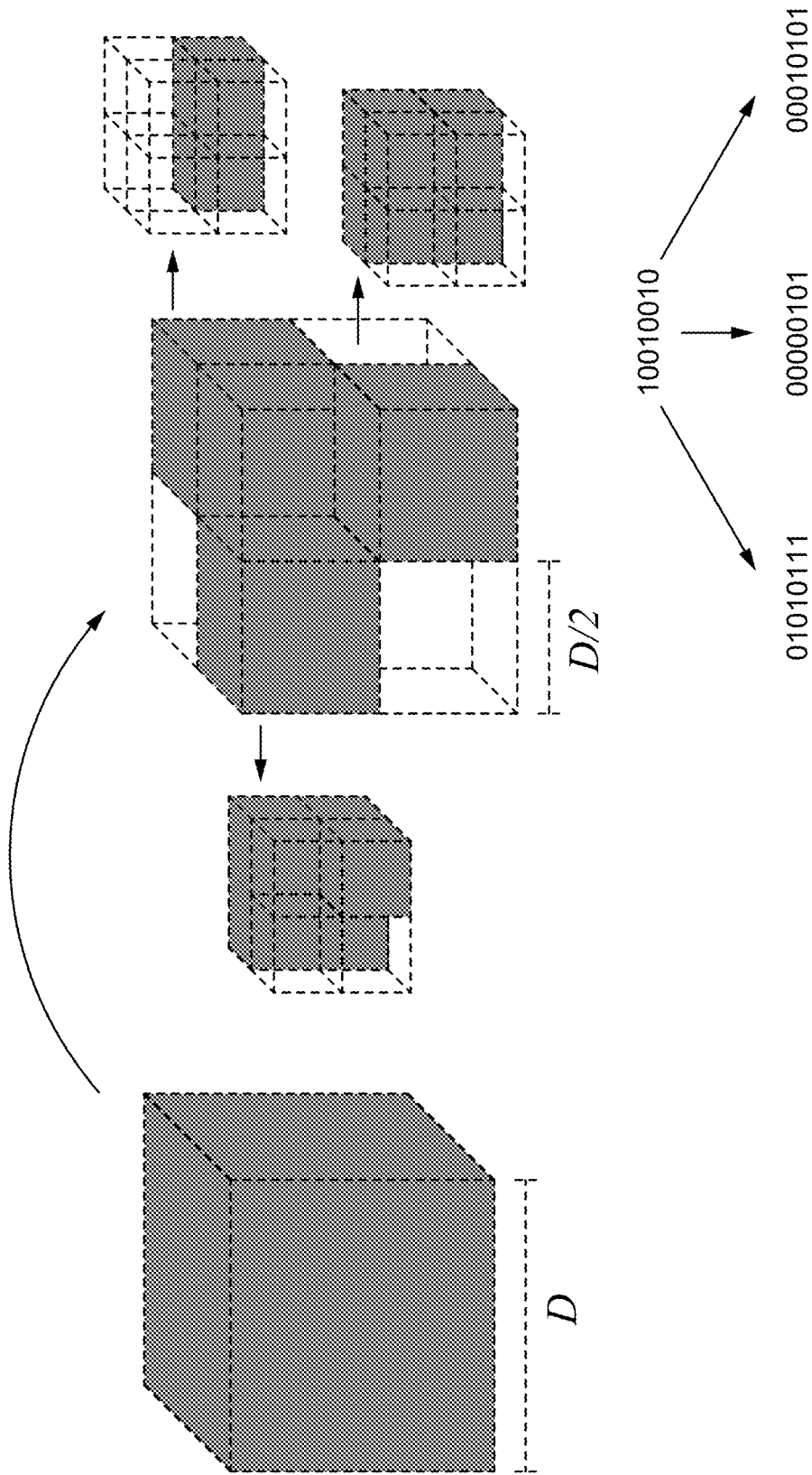
FIG. 2 illustrates the volume is segmented vertically and horizontally into eight sub-cubes with dimensions D/2×D/2×D/2 voxels, according to some embodiments.

The voxelized point cloud is represented using an octree structure in a lossless manner. It is assumed that the point cloud is contained in a quantized volume of D×D×D voxels. Initially, the volume is segmented vertically and horizontally into eight sub-cubes with dimensions D/2×D/2×D/2 voxels, as exemplified in FIG. 2. This process is recursively repeated for each occupied sub-cube until D is equal to 1. In general only one of the voxel positions is occupied, which makes octrees very convenient to represent the geometry of a point cloud. In each decomposition step, it is verified which blocks are occupied and which are not. Occupied blocks are marked as 1 and unoccupied blocks are marked as 0. The octets generated during this process represent an octree node occupancy state in a 1-byte word and are compressed by an entropy coder considering the correlation with neighboring octets. For the coding of isolated points, since there are no other points within the volume to correlate with, an alternative method to entropy coding the octets, namely Direct Coding Mode (DCM), is utilized. In DCM, coordinates of the point are directly coded without performing any compression. DCM mode is inferred from neighboring nodes in order to avoid signaling the usage of DCM for all nodes of the tree.

Surface Approximation Via Trisoup

Figure 3:
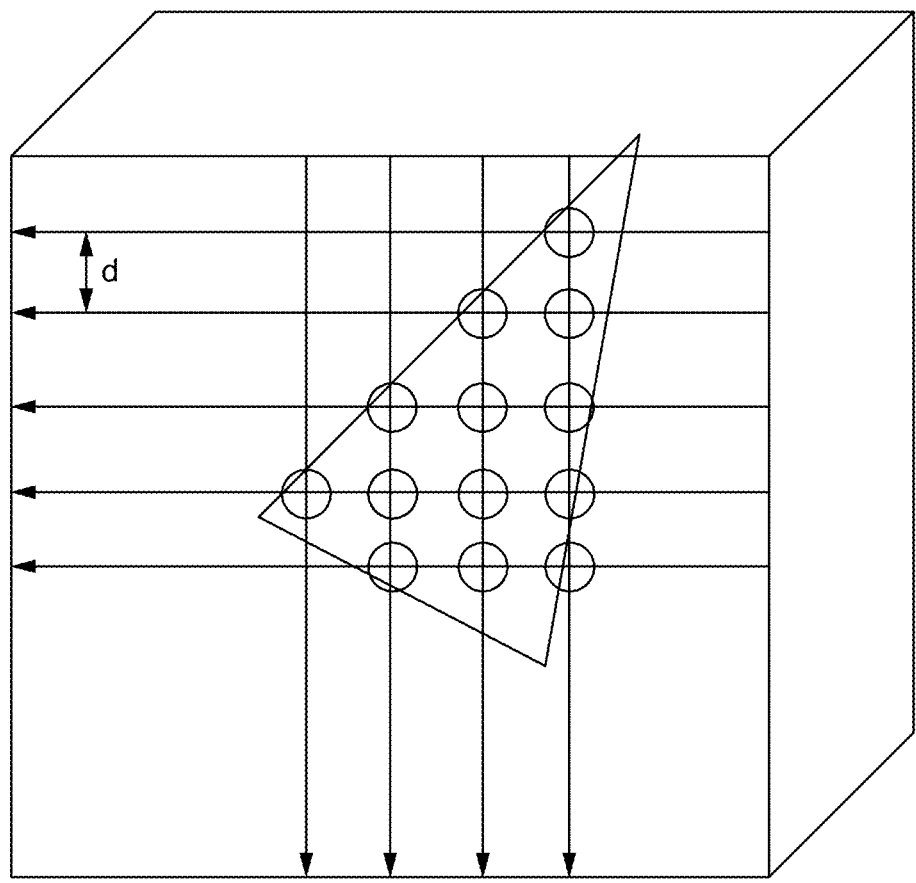
FIG. 3 illustrates the number of the derived points in the decoder determined by the voxel grid distance d, which can be controlled, according to some embodiments.

Alternatively, the geometry may be represented by a pruned octree, constructed from the root to an arbitrary level where the leaves represent occupied sub-blocks that are larger than a voxel. The object surface is approximated by a series of triangles, and since there is no connectivity information that relates the multiple triangles, the technique is called "triangle soup" (or trisoup). It is an optional coding tool that improves the subjective quality in lower bitrate as the quantization gives the rough rate adaptation. If trisoup is enabled, the geometry bitstream becomes a combination of octree, segment indicator, and vertex position information. In the decoding process, the decoder calculates the intersection point between the trisoup mesh plane and the voxelized grid. The number of the derived points in the decoder is determined by the voxel grid distance d, which can be controlled as shown in FIG. 3.

Attribute Encoding

In G-PCC, there are three methods for attribute coding, which are: RAHT; Predicting Transform; and Lifting Transform. The main idea behind RAHT is to use the attribute values in a lower octree level to predict the values in the next level. The Predicting Transform implements an interpolation-based hierarchical nearest-neighbor prediction scheme. The Lifting Transform is built on top of Predicting Transform but has an extra update/lifting step. Because of that, from this point forward they will be jointly referred to as Predicting/Lifting Transform. The user is free to choose either of the above-mentioned transforms. However, given a specific context, one method may be more appropriate than the other. The common criterion that determines which method to use is a combination of rate-distortion performance and computational complexity.

RAHT Transform

Figure 4:
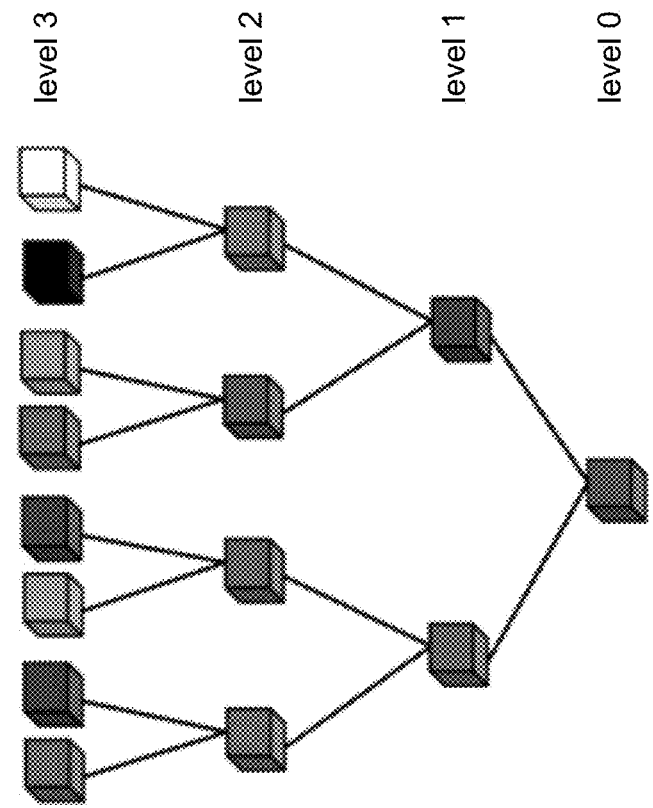
FIG. 4 illustrates the Region Adaptive Hierarchical Transform (RAHT), applied to each node and is performed in three steps, one in each x, y, and z directions, according to some embodiments.
Figure 4:
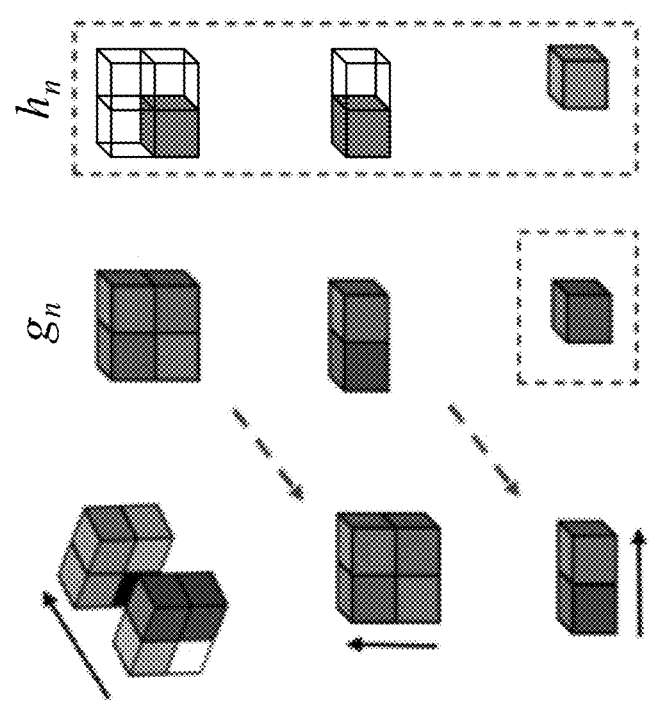

The RAHT is performed by considering the octree representation of the point cloud. In its canonical formulation, it starts from the leaves of the octree (highest level) and proceeds backwards until it reaches its root (lowest level). The transform is applied to each node and is performed in three steps, one in each x, y, and z directions, as illustrated in FIG. 4. At each step, the low-pass gn and high-pass hn coefficients are generated. RAHT is a Haar-inspired hierarchical transform. Thus, it can be better understood if a 1D Haar transform is taken as an initial example. Consider a signal v with N elements. The Haar decomposition of v generates g and h, which are the low-pass and high-pass components of the original signal, each one with N/2 elements. The n-th coefficients of g and h are calculated using the following equation:

$$\begin{bmatrix} g_n \\ h_n \end{bmatrix} = \frac{1}{\sqrt{2}} \begin{bmatrix} 1 & 1 \\ -1 & 1 \end{bmatrix} \begin{bmatrix} v_{2n} \\ v_{2n+1} \end{bmatrix} \quad (1)$$

The transform can be performed recursively taking the current g as the new input signal v, and at each recursion the number of low-pass coefficients is divided by a factor of 2. The g component can be interpreted as a scaled sum of equal-weighted consecutive pairs of v, and the h component as their scaled difference. However, if one chooses to use the Haar transform to encode point clouds, the transform is modified to take the sparsity of the input point cloud into account. This can be accomplished by allowing the weights to adapt according to the distribution of points. Hence, the recursive implementation of the RAHT can be defined as follows:

$$\begin{bmatrix} g_n^l \\ h_n^l \end{bmatrix} = T \begin{bmatrix} g_{2n}^{l+1} \\ g_{2n+1}^{l+1} \end{bmatrix} T = \frac{1}{\sqrt{w_1 + w_2}} \begin{bmatrix} \sqrt{w_1} & \sqrt{w_2} \\ -\sqrt{w_2} & \sqrt{w_1} \end{bmatrix}, \quad (2)$$

$$w_n^l = w_1 + w_2, \quad (3)$$

$$w_1 = w_{2n}^{l+1}, w_2 = w_{2n+1}^{l+1}, \quad (4)$$

where l is the decomposition level, $w_1$ and $w_2$ are the weights associated with the $g_{2n}^{l+1}$ and $g_{2n+1}^{l+1}$ or low-pass coefficients at level l+1, and $w_n^l$ is the weight of the low-pass coefficient $g_n^l$ at level l. As a result, higher weights are applied to the dense area points so that the RAHT can balance the signals in the transform domain better than the non-adaptive transform.

A fixed-point formulation of RAHT has been developed. It is based on matrix decompositions and scaling of quantization steps. Simulations showed that the fixed-point implementation can be considered equivalent to its floating point counterpart.

Figure 5:
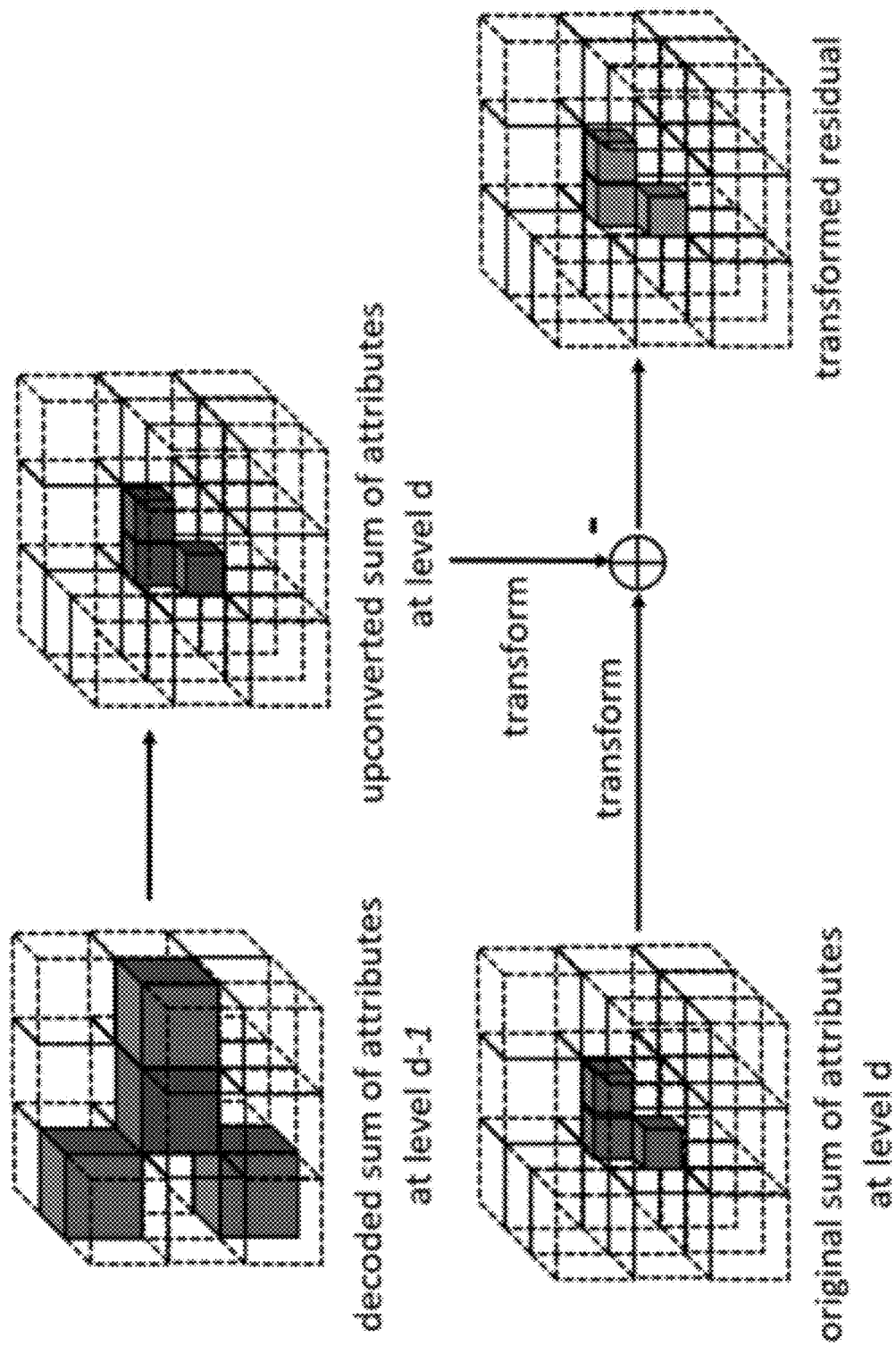
FIG. 5 illustrates the RAHT transform-domain prediction, according to some embodiments.

Most recently, a transform domain prediction in RAHT has been developed and is available in the current test model TMC13. The main idea is that for each block, the transformed upconverted sum of attributes at level d, calculated from the decoded sum of attributes at d−1, is used as a prediction to the transformed sum of attributes at level d, generating high-pass residuals that can be further quantized and entropically encoded. The upconverting process is accomplished by means of a weighted average of neighboring nodes. FIG. 5 shows a simplified illustration of the RAHT transform-domain prediction. Reported gains over RAHT formulation without prediction show significant improvements in a rate-distortion sense (up to around 30% overall average gains for color and 16% for reflectance).

Predicting/Lifting Transform

Figure 6:
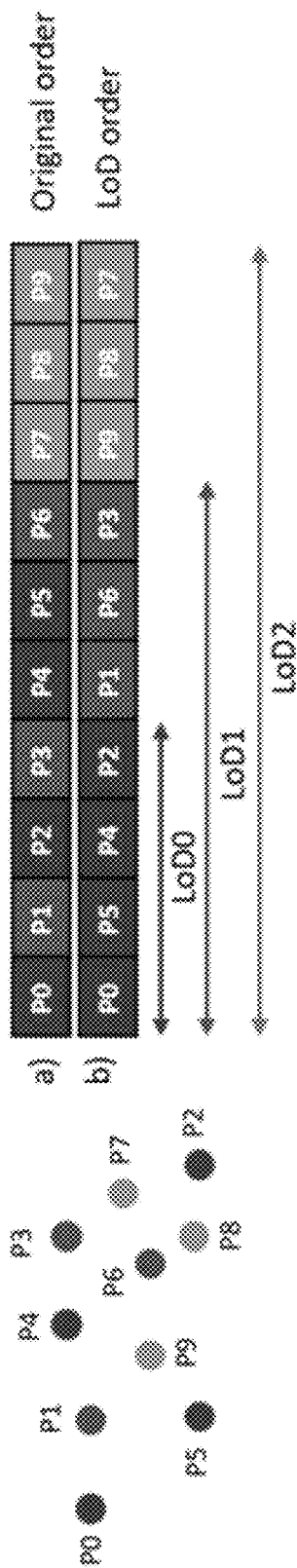
FIG. 6 illustrates an example of a sample point cloud organized in its original order, and reorganized into three refinement levels, as well as the correspondent Levels of Details (LoDO, LoD1, and LoD2), according to some embodiments.

The Predicting Transform is a distance-based prediction scheme for attribute coding. It uses a Level of Detail (LoD) representation that distributes the input points in sets of refinements levels (R) using a deterministic Euclidean distance criterion. FIG. 6 shows an example of a sample point cloud organized in its original order, and reorganized into three refinement levels, as well as the correspondent Levels of Details ($LoD_0$, $LoD_1$, and $LoD_2$). One may notice that a level of detail l is obtained by taking the union of refinement levels for 0 to l.

Figure 7:
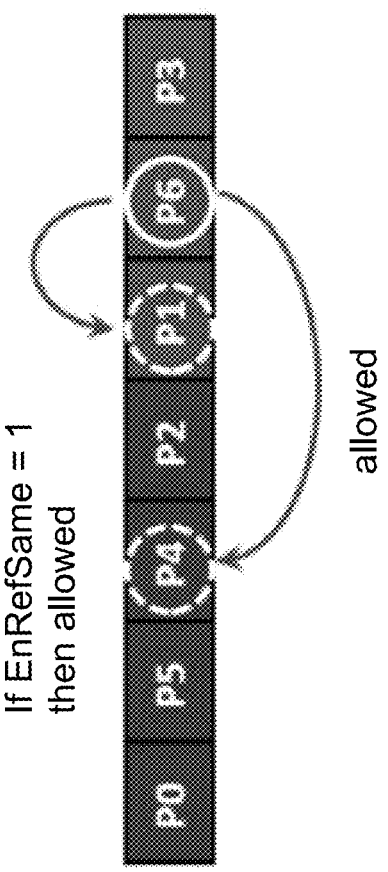
FIG. 7 illustrates prediction within the same refinement level can be performed by setting a flag to 1, according to some embodiments.

The attributes of each point are encoded using a prediction determined by the LoD order. Using FIG. 6 as an illustration, consider $LoD_0$ only. In this specific case, the attributes of $P_2$ can be predicted by the reconstructed versions of its nearest neighbors, $P_4$, $P_5$, or $P_0$, or by a distance-based weighted average of these points. The maximum number of prediction candidates can be specified, and the number of nearest neighbors is determined by the encoder for each point. In addition, a neighborhood variability analysis is performed. If the maximum difference between any two attributes in the neighborhood of a given point P is higher than a threshold, a rate-distortion optimization procedure is used to control the best predictor. By default, the attribute values of a refinement level R(j) are predicted using the attribute values of its k-nearest neighbors in the previous LoD, that is, LoD(j−1). However, prediction within the same refinement level can be performed by setting a flag to 1, as shown in FIG. 7.

Figure 8:
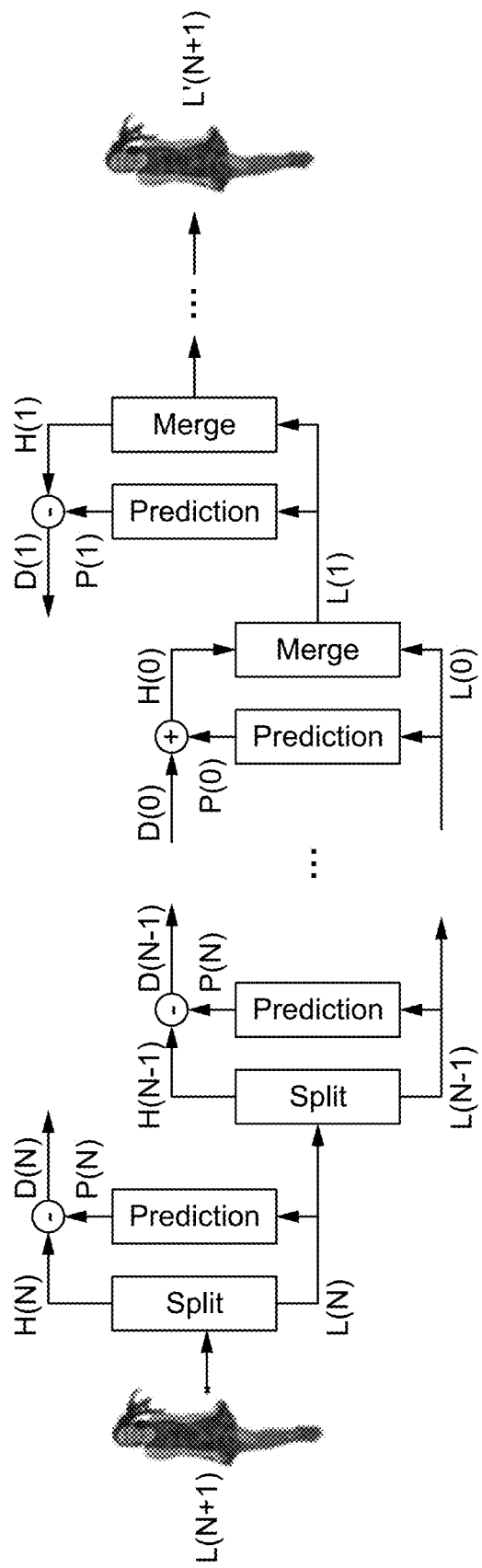
FIG. 8 illustrates a Predicting Transform, according to some embodiments.

The Predicting Transform is implemented using two operators based on the LoD structure, which are the split and merge operators. Let L(j) and H(j) be the sets of attributes associated with LoD(j) and R(j), respectively. The split operator takes L(j+1) as an input and returns the low resolution samples L(j) and the high-resolution samples H(j). The merge operator takes L(j) and H(j) and returns L(j+1). The Predicting Transform is illustrated in FIG. 8. Initially, the attributes signal L(N+1), which represents the whole point cloud, is split into H(N) and L(N). Then L(N) is used to predict H(N) and the residual D(N) is calculated.

After that, the process goes on recursively. The reconstructed attributes are obtained through the cascade of merge operations.

Figure 9:
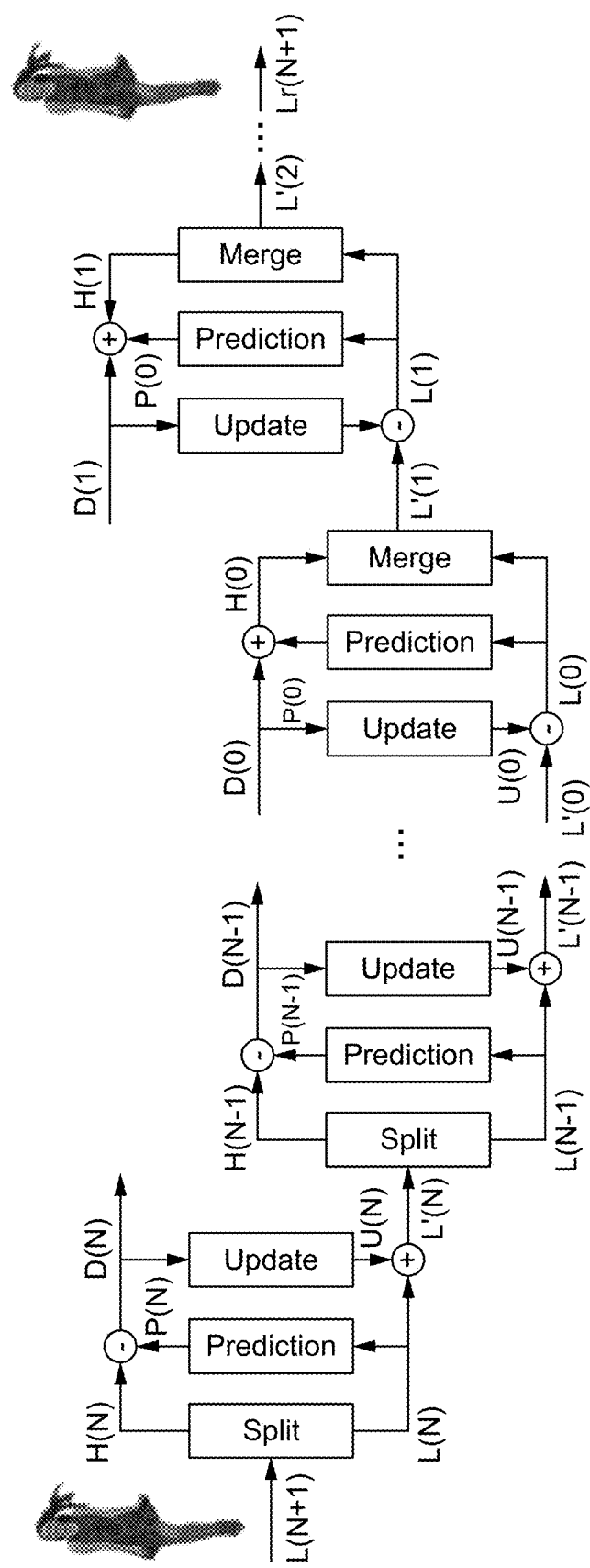
FIG. 9 illustrates a Lifting Transform built on top of the Predicting Transform, according to some embodiments.

The Lifting Transform, represented in the diagram of FIG. 9, is built on top of the Predicting Transform. It introduces an update operator and an adaptive quantization strategy. In the LoD prediction scheme, each point is associated with an influence weight. Points in lower LoDs are used more often and, therefore, impact the encoding process more significantly. The update operator determines U(j) based on the residual D(j) and then updates the value of L(j) using U(j), as shown in FIG. 9. The update signal U(j) is a function of the residual D(j), the distances between the predicted point and its neighbors, and their correspondent weights. Finally, to guide the quantization processes, the transformed coefficients associated with each point are multiplied by the square root of their respective weights.

In Octree, the volume of the point cloud where the point cloud is located is determined, and a cubic bounding box/block obtained, and then the block is divided into sub-blocks, and then for each iteration, it is determined if the sub-block contains a voxel, and if the sub-block contains more than a voxel, then the sub-block is divided further (e.g., decomposed), until the sub-block is composed of a single voxel.

In previous implementations of G-PCC, a single trisoup node size is utilized across all slices. Therefore, the node size for slice 0 would be the same as the node size for slice 1 which would be the same node size as slice N−1.

However, as described herein for the trisoup node size per slice implementation, the node size for one or more slices is able to be different. For example, the node size is able to increase or decrease as the slice number increases or decreases. Furthering the example, the node size for slice 0 is able to be very small, then the node size for slice 1 is able to be slightly larger, and so on until the node size for slice N−1 is the largest. In another example, the node size for slice 0 is a first size, and the node size for the other slices is a second size. The node size is able to be doubled each time (from slice to slice), squared, or another size change. For example, a user is able to specify the node size for each slice.

The block/node size is used with the concept of slices, on a slice-per-slice basis. The slices determine a number of points that are put in the slice. The point cloud is able to be segmented into slices as desired—for example, blocks of the same size or regions of interest. For example, specific regions of interest are able to be specified by the user/device. Furthering the example, using machine learning, face detection or any other shape/object is able to be detected to be separated as a group/slice. This enables the encoder to have a specific block/node size for each slice. By having different node sizes, it is possible to have different regions that are more important with larger amounts of triangles to approximate the surface, and regions that are less important with fewer triangles. This enables the encoder/decoder to be more flexible and efficient.

In some embodiments, the segmenting and node size determination is performed by a human (e.g., in a configuration file), and in some embodiments, these steps are performed using machine learning without human intervention. For example, a user is able to define 10 slices and 10 or fewer node sizes in a configuration file, and then the encoder uses the first node size for the first slice and so on. In another example, if a user defines fewer node sizes than slices, then the last node size is applied to the remaining slices (e.g., if there are five slices, and two node sizes defined, then the first slice uses the first node size, and the second through fifth slices use the second node size). For machine learning, a device/system is able to be trained to determine regions of interest (e.g., template matching or any other imaging processing for detecting faces, humans, specific objects (e.g., vehicles), animals, and/or any specified object). The device/system is also able to be trained to determine what node size is used for each slice. For example, if a slice contains a region of interest the device/system learns that the slice should use a smaller node size than if the slice does not contain a region of interest. Moreover, different levels of regions of interest are able to be developed/learned. For example, faces are able to be designated as the highest level region of interest, while the rest of the body is the second highest level region of interest, and so on until the lowest level region of interest such as background information.

In G-PCC, trisoup node size is indicated in the Geometry Parameter Set (GPS). Additionally, in Geometry Header, the trisoup node size parameter defined in GPS is used to indicate the remaining parameters for the trisoup coding, such as sampling value and number of unique segments. If it has a value different than 0, this indicates that trisoup will be used, with the tree level defined in GPS. If one wishes to use slices with trisoup, current notation does not allow for the node size to change on a slice basis. A high-level syntax modification is described herein to allow the control of the node size in trisoup coding on a slice basis. An enable flag GPS is able to be sent, and the node size value is able to be sent in the GDU header. The high-level syntax modifications are presented below.

The following is exemplary code for signaling for trisoup as described herein:

```
geometry_parameter_set( ) {
    gps_geom_parameter_set_id
    gps_seq_parameter_set_id
    gps_gsh_box_log2_scale_present_flag
    if(!gps_gsh_box_log2_scale_present_flag)
        gps_gs_box_log2_scale
    unique_geometry_points_flag
    geometry_planar_mode_flag
    if(geometry_planar_mode_flag) {
        geom_planar_mode_th_idcm
        geom_planar_mode_th[0]
        geom_planar_mode_th[1]
        geom_planar_mode_th[2]
        geometry_angular_mode_flag
    }
    if(geometry_angular_mode_flag) {
    for(k=0; k<3; k++)
        geom_angular_origin_xyz[k]
        number_lasers_minus1
        laser_angle[0]
        laser_correction[0]
        for (i=1; i<=number_lasers_minus1; i++) {
            laser_angle_diff[i]
            laser_correction_diff[i]
        }
        planar_buffer_disabled_flag
    }
    neighbour_context_restriction_flag
    inferred_direct_coding_mode_enabled_flag
    bitwise_occupancy_coding_flag
    adjacent_child_contextualization_enabled_flag
    log2_neighbour_avail_boundary
    log2_intra_pred_max_node_size
    trisoup_enable_flag
    geom_scaling_enabled_flag
    if (geom_scaling_enabled_flag) {
        geom_base_qp
        geom_direct_coding_mode_qp_offset
```

```
}
geom_tree_coded_axis_list_present_flag
gps_extension_flag
if (gps_extension_flag)
    while (more_data_in_byte_stream( ))
        gps_extension_data_flag
byte_alignment( )
}
Geometry data unit header syntax
geometry_data_unit_header( ) {
    gsh_geometry_parameter_set_id
    gsh_tile_id
    gsh_slice_id
    frame_idx
    if(gps_gsh_box_log2_scale_present_flag)
        gsh_box_log2_scale
    for(k=0; k<3; k++)
        gsh_box_origin_xyz[k]
    geom_tree_depth_minus1
    if(geom_tree_coded_axis_list_present_flag)
        for (lvl = 0; lvl <=geom_tree_depth_minus1; lvl++)
            for (k=0; k<3; k++)
                geom_tree_coded_axis_flag[lvl][k]
    gsh_entropy_stream_ent_minus1
    if (gsh_entropy_stream_ent_minus1) {
        gsh_entropy_stream_len_bits
        for (i=0; i < gsh_entropy_stream_ent_minus1; i++)
            gsh_entropy_stream_len[i]
    }
    if (geom_scaling_enabled_flag) {
        geom_slice_qp_offset
        geom_octree_qp_offsets_depth
    }
    if (trisoup_enabled_flag) {
        log2_trisoup_node_size
        trisoup_sampling_value_minus1
        num_unique_segments_minus1
    }
    byte_alignment( )
}
```

In this solution, trisoup_enabled_flag equal to 1 specifies that geometry data unit header may include trisoup coding syntax, including log 2_trisoup_node_size; trisoup_enabled_flag equal to 0 specifies that geometry data unit header includes only octree coding syntax. When trisoup_enabled_flag is 1, it is a requirement of bitstream conformance that: a) inferred_direct_coding_mode_enabled_flag must be equal to 0, and b) unique_geometry_points_flag must be equal to 1. The log 2_trisoup_node_size element specifies the variable TrisoupNodeSize as the size of the triangle nodes as follows: TrisoupNodeSize=(1<<log 2_trisoup_node_size−1).

Another possibility is to send a base node size in the GPS, a flag that enables a delta offset, and then send the delta in the GDU header.

```
Geometry parameter set syntax
geometry_parameter_set( ) {
    gps_geom_parameter_set_id
    gps_seq_parameter_set_id
    gps_gsh_box_log2_scale_present_flag
    if( !gps_gsh_box_log2_scale_present_flag)
        gps_gs_box_log2_scale
    unique_geometry_points_flag
    geometry_planar_mode_flag
    if( geometry_planar_mode_flag ) {
        geom_planar_mode_th_idem
        geom_planar_mode_th[ 0 ]
        geom_planar_mode_th[ 1 ]
        geom_planar_mode_th[ 2 ]
        geometry_angular_mode_flag
    }
    if( geometry_angular_mode_flag ) {
        for( k = 0; k < 3; k++)
            geom_angular_origin_xyz[ k ]
        number_lasers_minus1
        laser_angle[ 0 ]
        laser_correction[ 0 ]
        for( i = 1; i <= number_lasers_minus1; i++ ) {
            laser_angle_diff[ i ]
            laser_correction_diff[ i ]
        }
        planar_buffer_disabled_flag
    }
    neighbour_context_restriction_flag
    inferred_direct_coding_mode_enabled_flag
    bit_wise_occupancy_coding_flag
    adjacent_child_contextualization_enabled_flag
    log2_neighbour_avail_boundary
    log2_intra_pred_max_node_size
    log2_trisoup_node_size
    log2_trisoup_node_size_offset_present_flag
    geom_scaling_enabled_flag
    if( geom_scaling_enabled_flag ) {
        geom_base_qp
        geom_direct_coding_mode_qp_offset
    }
    geom_tree_coded_axis_list_present_flag
    gps_extension_flag
    if( gps_extension_flag )
        while( more_data_in_byte_stream( ) )
            gps_extension_data_flag
    byte_alignment( )
}
Geometry data unit header syntax
geometry_data_unit_header( ) {
    gsh_geometry_parameter_set_id
    gsh_tile_id
    gsh_slice_id
    frame_idx
    if( gps_gsh_box_log2_scale_present_flag )
        gsh_box_log2_scale
    for( k = 0; k < 3; k++ )
        gsh_box_origin_xyz[ k ]
    geom_tree_depth_minus1
    if( geom_tree_coded_axis_list_present_flag )
        for( lvl = 0; lvl <= geom_tree_depth_minus1; lvl++ )
            for( k = 0; k < 3; k++)
                geom_tree_coded_axis_flag[ lvl ][ k ]
    gsh_entropy_stream_ent_minus1
    if( gsh_entropy_stream_ent_minus1 ) {
        gsh_entropy_stream_len_bits
        for( i = 0; i < gsh_entropy_stream_ent_minus1; i++)
            gsh_entropy_stream_len[ i ]
    }
    if( geom_scaling_enabled_flag ) {
        geom_slice_qp_offset
        geom_octree_qp_offsets_depth
    }
    if(log2_trisoup_node_size ) {
        if(log2_trisoup_node_size_offset_present_flag )
            log2_trisoup_node_size_offset
        trisoup_sampling_value_minus1
        num_unique_segments_minus1
    }
    byte_alignment( )
}
```

In this solution, log 2_trisoup_node_size_offset_present_flag equal to 1 specifies that trisoup node size offset indicated by log 2_trisoup_node_size_offset is present in the geometry data unit header; log 2_trisoup_node_size offset_present_flag equal to 0 specifies that no such offset is present. The element log 2_trisoup_node_size_offset specifies an offset relative to the log 2_trisoup_node_size for use in trisoup coding syntax.

Figure 10:
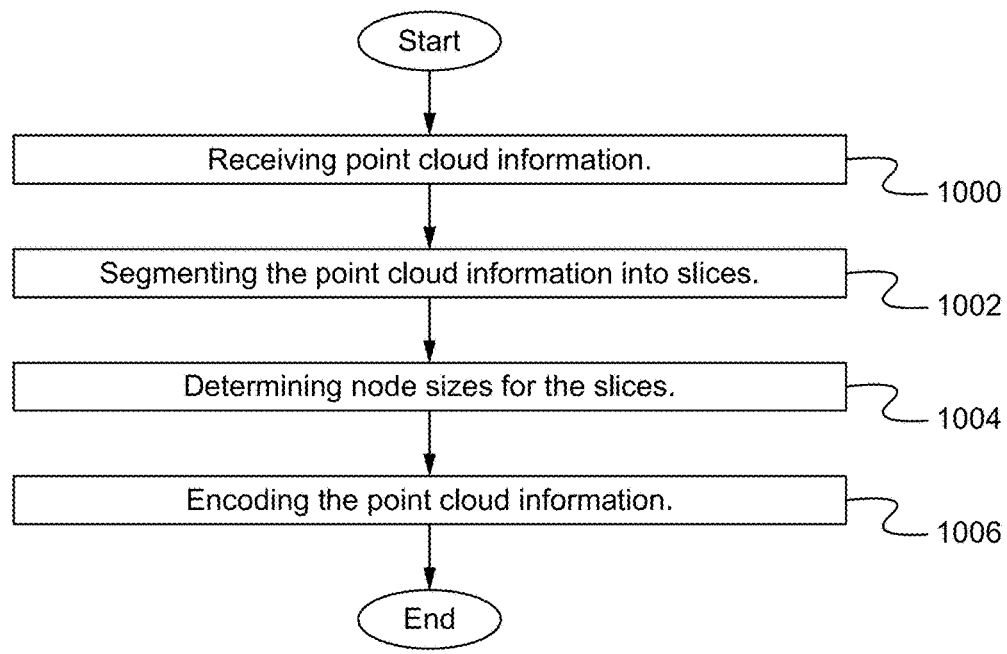
FIG. 10 illustrates a flowchart of a method of encoding a point cloud utilizing trisoup node size per slice according to some embodiments.

FIG. 10 illustrates a flowchart of a method of encoding a point cloud utilizing trisoup node size per slice according to some embodiments. In the step 1000, a device receives point cloud information. For example, the point cloud information is received directly from camera devices and/or is downloaded.

In the step 1002, the point cloud information is segmented/divided into slices. The segmentation is able to be performed by a human or via machine learning. For example, a user indicates/selects slices. In another example, a device/system utilizes machine learning to indicate/select slices such as by determining regions of interest and selecting those regions as specific slices. Regions of interest are able to be determined by a machine using any image processing technique such as facial recognition, body recognition and/or other object detection/recognition.

In the step 1004, node/block sizes are determined for the slices. The node sizes are able to be determined by a human or via machine learning. For example, a user is able to edit a configuration file to indicate the size of each node based on the slice. The information is able to include specifics such as slice 0 is a first specified node size, slice 1 is a second specified node size, and so on, or more general information such that the node size increases or decreases as the slice number goes up. In another example, the node size is determined by machine learning such as the device/system learning that specific slices (e.g., based on determined regions) have smaller node sizes when compared with slices that do not include a region of interest. For example, using classifications, the device/system utilizes a smallest node size for a slice with a face, a second smallest node size for a slice with a body (non-face), and a largest node size for other slices. The node sizes are able to be based on voxels or any other unit (e.g. smallest is 1 voxel, second smallest is 2 voxels, and largest is 4 voxels).

In the step 1006, an encoder encodes the point cloud information based on the slices and node sizes. The encoding is described in the G-PCC standard and is modified as described herein based on the slice and node size information.

In some embodiments, fewer or additional steps are able to be implemented. For example, a decoder decodes the point cloud information based on the varying node sizes and slices. In some embodiments, the order of the steps is modified. For example, the order of the steps of selecting slices and determining node sizes is able to be switched.

Figure 11:
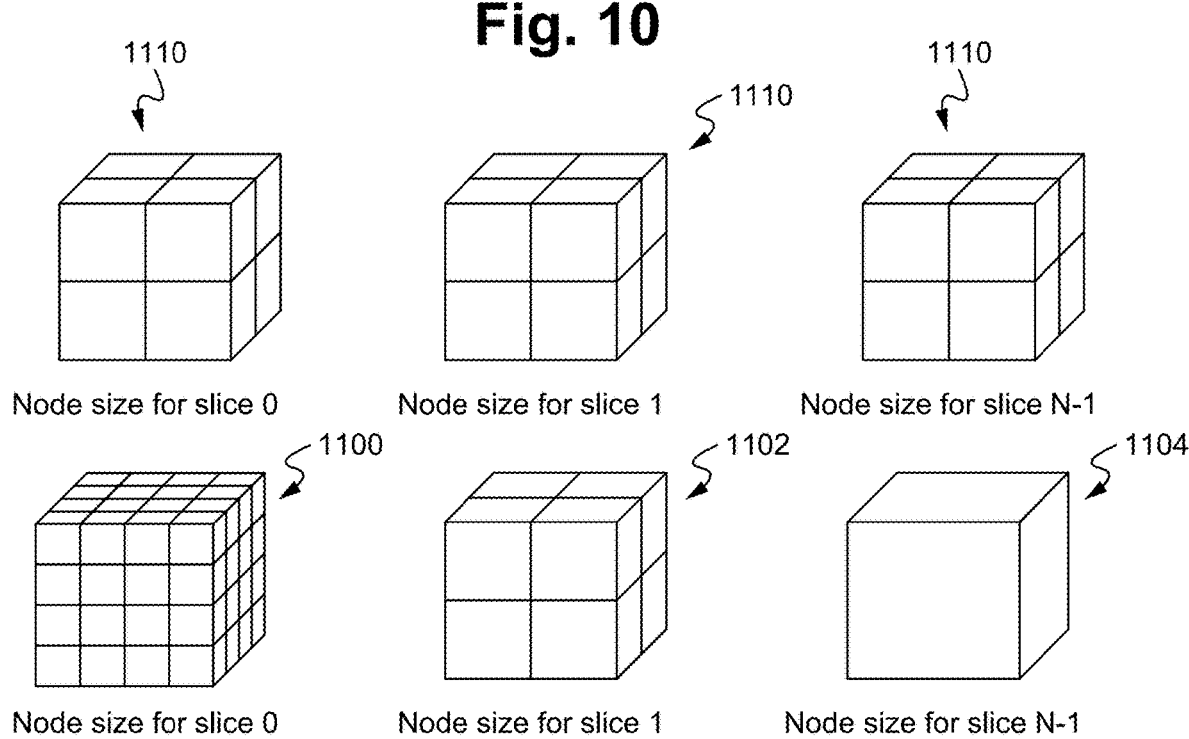
FIG. 11 illustrates a diagram of the trisoup node size per slice method according to some embodiments.

FIG. 11 illustrates a diagram of the trisoup node size per slice method according to some embodiments. As shown, the geometry coding flexibility of G-PCC is able to be increased by allowing it to operate with a different trisoup node size for each slice. The prior G-PCC implementation 1110 uses a single trisoup node size across all slices. In the trisoup node size per slice method, the node size for slice 0 1100 is smaller than the node size for slice 1 1102 and so on until the largest node size for slice N–1 1104.

Figure 12:
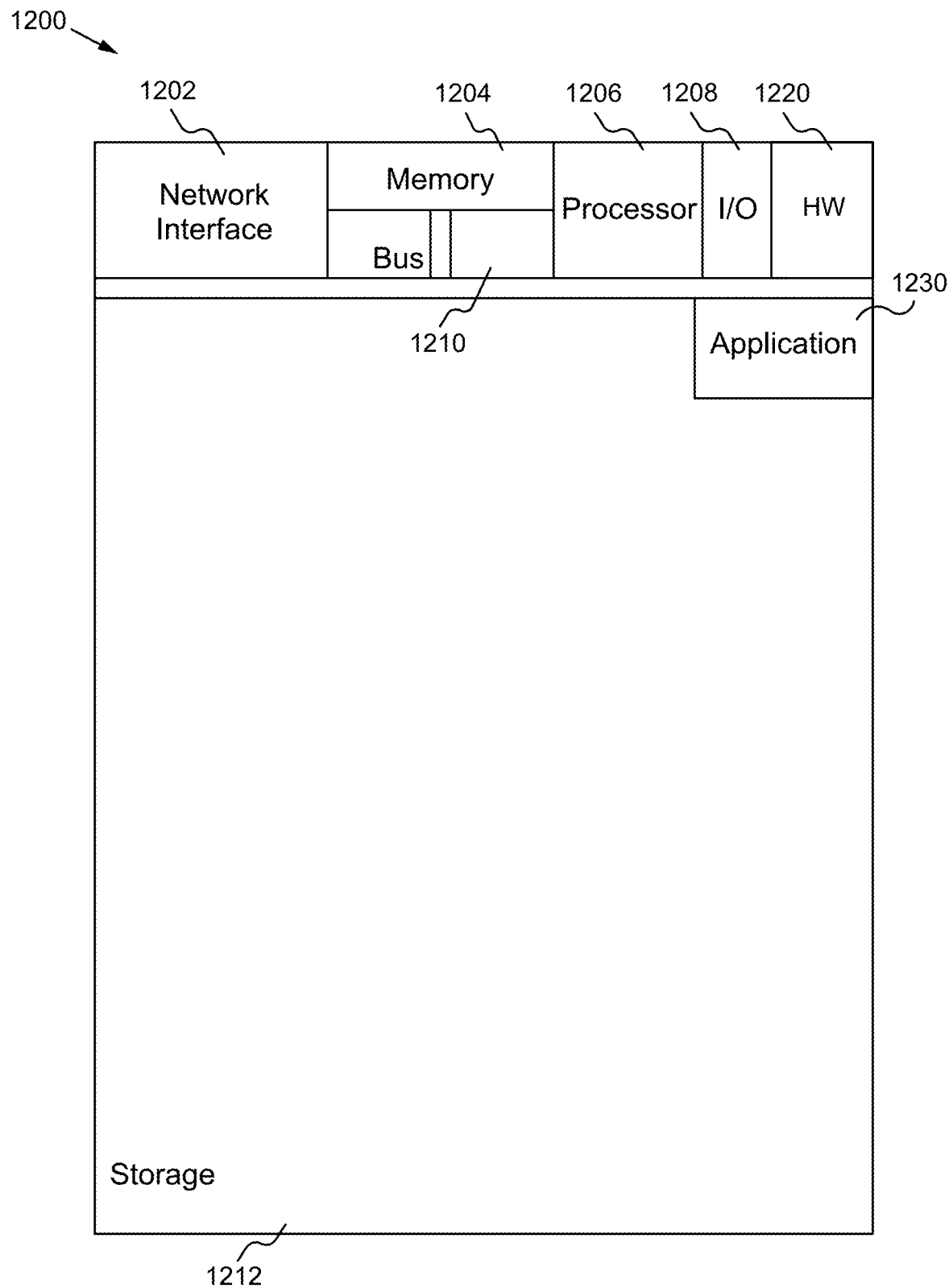
FIG. 12 illustrates a block diagram of an exemplary computing device configured to implement the trisoup node size per slice method according to some embodiments.

FIG. 12 illustrates a block diagram of an exemplary computing device configured to implement the trisoup node size per slice method according to some embodiments. The computing device 1200 is able to be used to acquire, store, compute, process, communicate and/or display information such as images and videos including 3D content. The computing device 1200 is able to implement any of the G-PCC, point cloud coding, and/or trisoup node size per slice method aspects. In general, a hardware structure suitable for implementing the computing device 1200 includes a network interface 1202, a memory 1204, a processor 1206, I/O device(s) 1208, a bus 1210 and a storage device 1212. The choice of processor is not critical as long as a suitable processor with sufficient speed is chosen. The memory 1204 is able to be any conventional computer memory known in the art. The storage device 1212 is able to include a hard drive, CDROM, CDRW, DVD, DVDRW, High Definition disc/drive, ultra-HD drive, flash memory card or any other storage device. The computing device 1200 is able to include one or more network interfaces 1202. An example of a network interface includes a network card connected to an Ethernet or other type of LAN. The I/O device(s) 1208 are able to include one or more of the following: keyboard, mouse, monitor, screen, printer, modem, touchscreen, button interface and other devices. Trisoup node size per slice application(s) 1230 used to implement the trisoup node size per slice method are likely to be stored in the storage device 1212 and memory 1204 and processed as applications are typically processed. More or fewer components shown in FIG. 12 are able to be included in the computing device 1200. In some embodiments, trisoup node size per slice hardware 1220 is included. Although the computing device 1200 in FIG. 12 includes applications 1230 and hardware 1220 for the trisoup node size per slice method, the trisoup node size per slice method is able to be implemented on a computing device in hardware, firmware, software or any combination thereof. For example, in some embodiments, the trisoup node size per slice applications 1230 are programmed in a memory and executed using a processor. In another example, in some embodiments, the trisoup node size per slice hardware 1220 is programmed hardware logic including gates specifically designed to implement the trisoup node size per slice method.

In some embodiments, the trisoup node size per slice application(s) 1230 include several applications and/or modules. In some embodiments, modules include one or more sub-modules as well. In some embodiments, fewer or additional modules are able to be included.

In some embodiments, the trisoup node size per slice hardware 1220 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 13:
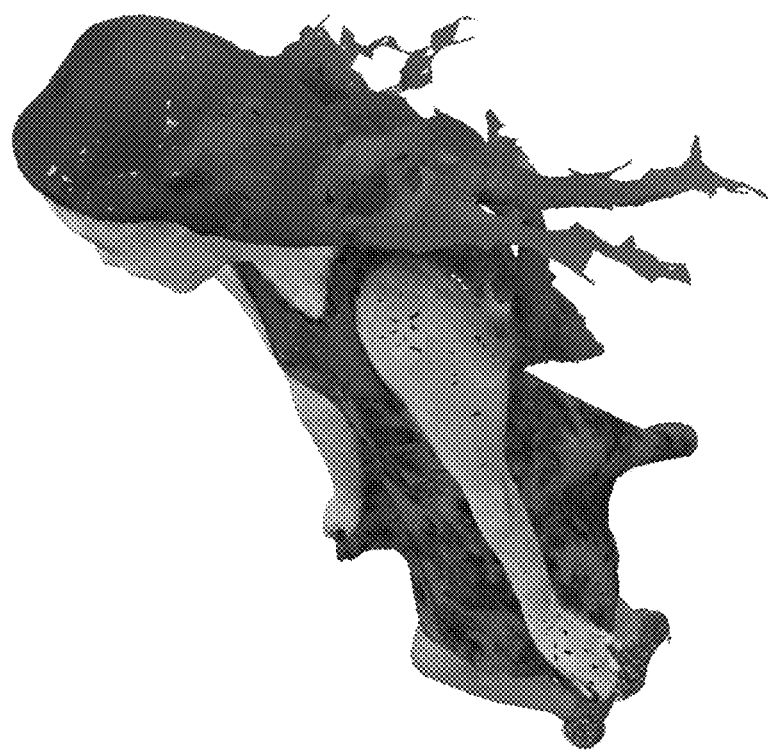
FIG. 13 illustrates experimental results where the node size is constant.

FIG. 13 illustrates experimental results where the node size is constant. Specifically, in the experiment, trisoup_node_size_log 2 equals 4 for all nodes.

Figure 14:
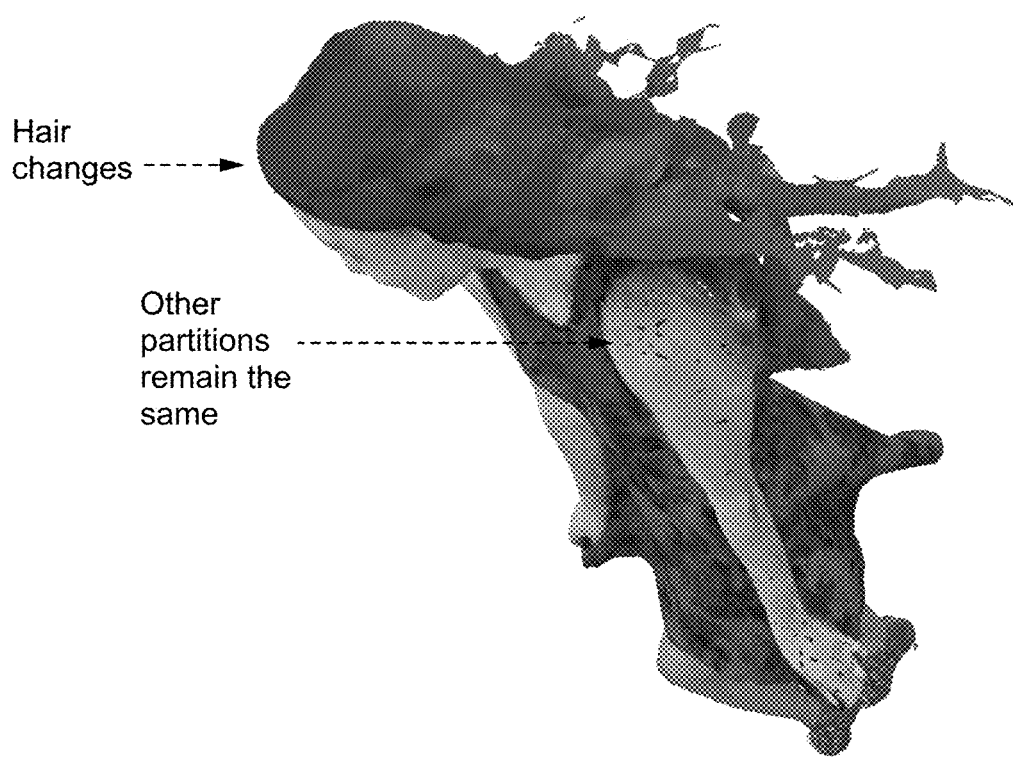
FIG. 14 illustrates experimental results with different node sizes according to some embodiments.

FIG. 14 illustrates experimental results with different node sizes according to some embodiments. Specifically, in the experiment, trisoup_node_size_log 2 equals 4 for partitions (e.g., slices) 1, 2 and 3, and trisoup_node_size_log 2 equals 1 for partition 0. In this result, the quality of the hair (partition 0) is improved with the smaller node size.

Figure 15:
FIG. 15 illustrates a comparison of experimental results with constant node sizes versus different node sizes according to some embodiments.

FIG. 15 illustrates a comparison of experimental results with constant node sizes versus different node sizes according to some embodiments. Specifically, in the left image, the trisoup_node_size_log 2 equals 3 and is constant for all partitions. In the right image, the trisoup_node_size_log 2 equals 3 for partitions 1, 2 and 3, and trisoup_node_size_log 2 equals 1 for partition 0. In this result, the quality of the right image in partition 0 (above the dividing line) is improved with the smaller node size when compared with partition 0 of the left image and the other partitions of both images.

Figure 16:
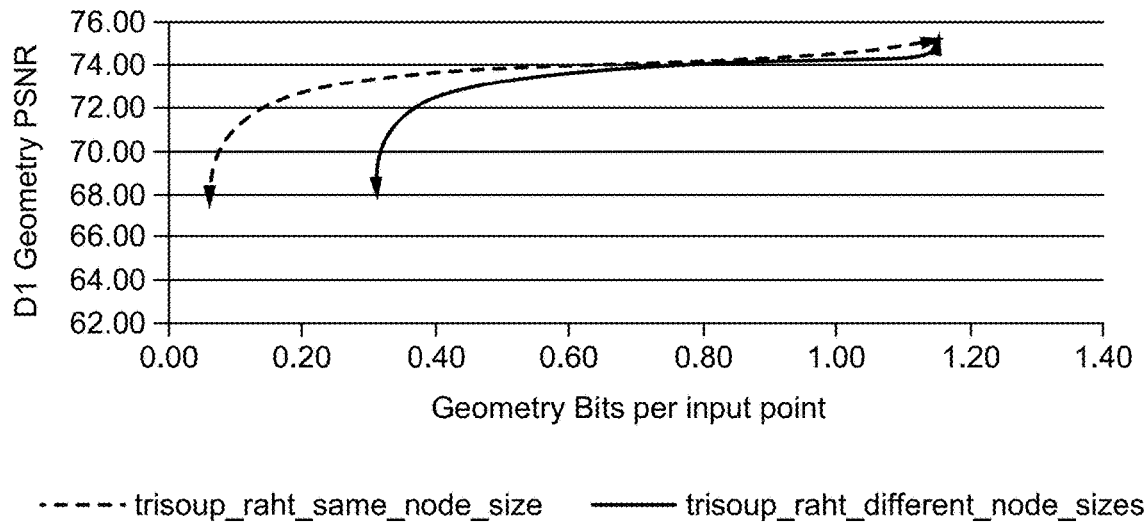
FIG. 16 illustrates PSNR plots according to some embodiments.
Figure 16:
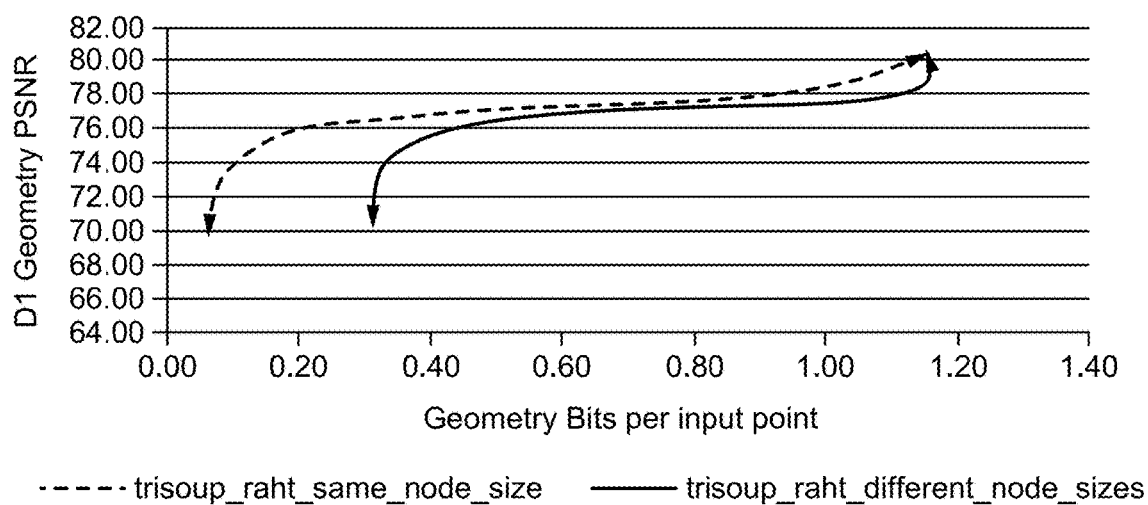

FIG. 16 illustrates PSNR plots according to some embodiments. A comparison of the peak signal-to-noise ratio (PSNR) is shown for where the node size is constant versus when different node sizes are utilized.

To utilize the trisoup node size per slice method described herein, a device acquires or receives 3D content and processes and/or sends the content in an optimized manner to enable proper, efficient display of the 3D content. The trisoup node size per slice method is able to be implemented with user assistance or automatically without user involvement.

In operation, the trisoup node size per slice method more efficiently encodes 3D content. The trisoup node size per slice method enables flexibility when encoding a point cloud. Instead of each block/node being the same size, a user or machine is able to indicate block/node sizes such that regions of interest are able to have smaller node sizes for more specificity in that region.

Some Embodiments of Trisoup Node Size Per Slice

1. A method programmed in a non-transitory memory of a device comprising:
   receiving point cloud information;
   segmenting the point cloud information into a plurality of slices;
   determining a plurality of node sizes; and
   encoding the point cloud using a node size of the plurality of node sizes for each of the plurality of slices.
2. The method of clause 1 wherein the node size is determined according to a region of interest criterion.
3. The method of clause 2 wherein the node size is decreased for a region of interest.
4. The method of clause 3 wherein the plurality of node sizes include smaller node sizes for the slices that represent the region of interest and larger node sizes for the remaining slices.
5. The method of clause 1 wherein an amount of the plurality of slices is not required to equal the amount of the plurality of node sizes.
6. The method of clause 1 wherein the plurality of node sizes are programmed by a user by specifying the node size in a configuration file.
7. The method of clause 1 wherein the plurality of node sizes are determined using machine learning.
8. The method of clause 1 wherein the plurality of node sizes are determined according to any arbitrary criteria other than region of interest.
9. An apparatus comprising:
   a non-transitory memory for storing an application, the application for:
      receiving point cloud information;
      segmenting the point cloud information into a plurality of slices;
      determining a plurality of node sizes; and
      encoding the point cloud using a node size of the plurality of node sizes for each of the plurality of slices; and
   a processor coupled to the memory, the processor configured for processing the application.
10. The apparatus of clause 9 wherein the node size is determined according to a region of interest criterion.
11. The apparatus of clause 10 wherein the node size is decreased for the region of interest.
12. The apparatus of clause 11 wherein the plurality of node sizes include smaller node sizes for the slices that represent the region of interest and larger node sizes for the remaining slices.
13. The apparatus of clause 9 wherein an amount of the plurality of slices is not required to equal the amount of the plurality of node sizes.
14. The apparatus of clause 9 wherein the plurality of node sizes are programmed by a user by specifying the node size in a configuration file.
15. The apparatus of clause 9 wherein the plurality of node sizes are determined using machine learning.
16. The apparatus of clause 9 wherein the plurality of node sizes is determined according to any arbitrary criteria other than region of interest.
17. A system comprising:
   an encoder configured for:
      receiving point cloud information;
      segmenting the point cloud information into a plurality of slices;
      determining a plurality of node sizes; and
      encoding the point cloud using a node size of the plurality of node sizes for each of the plurality of slices; and
   a decoder configured for decoding the encoded point cloud information.
18. The system of clause 17 wherein the node size is determined according to a region of interest criterion.
19. The system of clause 18 wherein the node size is decreased for the region of interest.
20. The system of clause 19 wherein the plurality of node sizes include smaller node sizes for the slices that represent the region of interest and larger node sizes for the remaining slices.
21. The system of clause 17 wherein an amount of the plurality of slices is not required to equal the amount of the plurality of node sizes.
22. The system of clause 17 wherein the plurality of node sizes are programmed by a user by specifying the node size in a configuration file.
23. The system of clause 17 wherein the plurality of node sizes are determined using machine learning.
24. The system of clause 17 wherein the plurality of node sizes is determined according to any arbitrary criteria other than region of interest.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   receiving point cloud information;
   segmenting the point cloud information into a plurality of slices;
   determining a plurality of node sizes; and
   encoding the point cloud using a node size of the plurality of node sizes for each of the plurality of slices, wherein the node size doubles as a slice number of the plurality of slices increases, wherein when fewer node sizes are defined than the number of slices, a last node size is applied to remaining slices greater than the number of defined node sizes.

2. The method of claim 1 wherein the node size is determined according to a region of interest criterion.

3. The method of claim 2 wherein the node size is decreased for a region of interest.

4. The method of claim 3 wherein the plurality of node sizes include smaller node sizes for the slices that represent the region of interest and larger node sizes for the remaining slices.

5. The method of claim 1 wherein an amount of the plurality of slices is not required to equal the amount of the plurality of node sizes.

6. The method of claim 1 wherein the plurality of node sizes are programmed by a user by specifying the node size in a configuration file.

7. The method of claim 1 wherein the plurality of node sizes are determined using machine learning.

8. The method of claim 1 wherein the plurality of node sizes are determined according to any arbitrary criteria other than region of interest.

9. An apparatus comprising:
a non-transitory memory for storing an application, the application for:
receiving point cloud information;
segmenting the point cloud information into a plurality of slices;
determining a plurality of node sizes; and
encoding the point cloud using a node size of the plurality of node sizes for each of the plurality of slices, wherein the node size doubles as a slice number of the plurality of slices increases, wherein when fewer node sizes are defined than the number of slices, a last node size is applied to remaining slices greater than the number of defined node sizes; and
a processor coupled to the memory, the processor configured for processing the application.

10. The apparatus of claim 9 wherein the node size is determined according to a region of interest criterion.

11. The apparatus of claim 10 wherein the node size is decreased for the region of interest.

12. The apparatus of claim 11 wherein the plurality of node sizes include smaller node sizes for the slices that represent the region of interest and larger node sizes for the remaining slices.

13. The apparatus of claim 9 wherein an amount of the plurality of slices is not required to equal the amount of the plurality of node sizes.

14. The apparatus of claim 9 wherein the plurality of node sizes are programmed by a user by specifying the node size in a configuration file.

15. The apparatus of claim 9 wherein the plurality of node sizes are determined using machine learning.

16. The apparatus of claim 9 wherein the plurality of node sizes is determined according to any arbitrary criteria other than region of interest.

17. A system comprising:
an encoder configured for:
receiving point cloud information;
segmenting the point cloud information into a plurality of slices;
determining a plurality of node sizes; and
encoding the point cloud using a node size of the plurality of node sizes for each of the plurality of slices, wherein the node size doubles as a slice number of the plurality of slices increases, wherein when fewer node sizes are defined than the number of slices, a last node size is applied to remaining slices greater than the number of defined node sizes; and
a decoder configured for decoding the encoded point cloud information.

18. The system of claim 17 wherein the node size is determined according to a region of interest criterion.

19. The system of claim 18 wherein the node size is decreased for the region of interest.

20. The system of claim 19 wherein the plurality of node sizes include smaller node sizes for the slices that represent the region of interest and larger node sizes for the remaining slices.

21. The system of claim 17 wherein an amount of the plurality of slices is not required to equal the amount of the plurality of node sizes.

22. The system of claim 17 wherein the plurality of node sizes are programmed by a user by specifying the node size in a configuration file.

23. The system of claim 17 wherein the plurality of node sizes are determined using machine learning.

24. The system of claim 17 wherein the plurality of node sizes is determined according to any arbitrary criteria other than region of interest.

* * * * *